United States Patent
Reeves

(10) Patent No.: US 9,494,244 B2
(45) Date of Patent: Nov. 15, 2016

(54) REPAIRABLE CARTRIDGE VALVE

(71) Applicant: G. P. Reeves, Inc., Holland, MI (US)

(72) Inventor: Gordon Reeves, Holland, MI (US)

(73) Assignee: G. P. Reeves, Inc., Holland, MI (US)

( * ) Notice: Subject to any disclaimer, the term of this patent is extended or adjusted under 35 U.S.C. 154(b) by 44 days.

(21) Appl. No.: 14/522,092

(22) Filed: Oct. 23, 2014

(65) Prior Publication Data

US 2015/0152970 A1  Jun. 4, 2015

Related U.S. Application Data

(60) Provisional application No. 61/911,743, filed on Dec. 4, 2013.

(51) Int. Cl.
*F16K 31/00* (2006.01)
*F16K 27/02* (2006.01)
*F16K 31/122* (2006.01)

(52) U.S. Cl.
CPC .......... *F16K 27/02* (2013.01); *F16K 31/1225* (2013.01); *Y10T 29/49412* (2015.01)

(58) Field of Classification Search
CPC ............... F16K 27/02; F16K 31/1225; Y10T 137/49412
USPC ....... 251/62, 63, 63.5, 63.4, 77; 137/315.11, 137/15.01; 285/305
See application file for complete search history.

(56) References Cited

U.S. PATENT DOCUMENTS

| 4,260,184 | A | * | 4/1981 | Greenawalt | F16L 37/53 285/305 |
|---|---|---|---|---|---|
| 4,858,645 | A | * | 8/1989 | Reeves | F04B 49/106 137/551 |
| 7,143,993 | B2 | * | 12/2006 | Everingham | F16K 31/047 123/568.24 |
| 2009/0289423 | A1 | * | 11/2009 | Sugita | F16J 15/20 277/511 |
| 2013/0234055 | A1 | * | 9/2013 | Young | F16K 31/122 251/62 |

OTHER PUBLICATIONS

Doering poppet valve, Hydraulic or Gas (high pressure) Pilot, 5 GPM, 14.1, Bi-Directional, http://www.doering.com/pdf/1201424. pdf, Published Nov. 20, 2008.*

* cited by examiner

*Primary Examiner* — Marina Tietjen
*Assistant Examiner* — Umashankar Venkatesan
(74) *Attorney, Agent, or Firm* — Price Heneveld LLP

(57) ABSTRACT

A cartridge valve comprises an operator section for operating a valve, and a cartridge section with the valve. The operator section includes a first body and two pistons on a common shaft. The cartridge section includes a second body with valve seat, a cartridge insert having a protruding portion with annular ring, and a valve poppet operably engaging the valve seat. Two retainer screws engage the annular ring to hold the first and second bodies longitudinally together but permit rotation. The piston shaft defines a gap to the valve poppet when in a home position so that the shaft and piston initially gain momentum before abutting the valve poppet. The cartridge insert can be removed from the second body to allow replacement of a poppet seal therebetween.

10 Claims, 8 Drawing Sheets

REPAIRABLE CARTRIDGE VALVE

CROSS-REFERENCE TO RELATED APPLICATION

This application claims benefit under 35 USC section 119(e) of U.S. Provisional Application Ser. No. 61/911,743, filed Dec. 4, 2013, entitled REPAIRABLE AIR PILOT CARTRIDGE VALVE, the entire contents of which are incorporated herein in their entirety.

BACKGROUND OF THE INVENTION

The present invention relates to air pilot cartridge valves, and more particularly relates to an air pilot cartridge valve that can be disassembled and repaired, and also that resists leakage during high back pressure and additionally that is configured to actuate against high back pressure.

Air pilot operated cartridge valves have been used for many years, and are commercially available, such as through Doering Company. The known Doering air pilot operated cartridge valve includes an actuator (also called an "operator" herein) incorporating a single acting return air cylinder and a cartridge valve section with single-stem poppet. The cartridge valve section is designed to fit a standard hydraulic valve 8-2 size cavity. The cartridge valve section's body includes a hex to receive a wrench to facilitate installation. Rotating the hex on the valve section threads the valve into the cavity. The air pilot operator is free to not rotate with the hex.

The above known air pilot operated cartridge valve has at least three major faults. Its single air piston must be large enough to provide the area for the force necessary to move the poppet off the seat. However, this is especially a problem when the poppet return spring has to have enough force to keep the poppet on the seat when high pressure is on the output port 2 instead of input port 1, or when pressure on output port 2 is higher than pressure on input port 1. Also, the poppet seal and air pilot operator in the known air pilot cartridge valve are so difficult to replace that the valve is considered to be a "throw away". Even the manufacturing company will not repair these valves. Still further, construction design and assembly methods are press fits, such they do not allow space for a replaceable poppet seal.

More specifically, a large 1⅞" diameter air pilot operator is necessary when the valve must stop high back pressure flow from a (normally output) port 2 to a (normally input) port 1. However, larger diameter air pilot sections limit installation options, since such valves are often used in very tight locations on a control manifold.

Also, air pilot operated cartridge valves are often used as hydraulic valves or valves for high viscosity fluids. For example, I have used them in automatic apparatus lubricating grease systems. In fact, many of my dispensing systems are being used for materials that have an apparent viscosity similar to grease, but that are not lubricating grease. Some of these materials such as anti-seize compounds contain abrasives that can damage dynamic resilient seals. When used to dispense anti-seize compounds, the poppet seal in the known valve can wear out in less than 250,000 cycles (which is costly and a problem since it is not replaceable).

SUMMARY OF THE INVENTION

In one aspect of the present invention, a cartridge valve comprises an operator section including at least one piston; a cartridge section including a second body with viscous fluid inlet and outlet ports, and a valve seat; and a valve poppet operably engaging the valve seat for controlling flow to the outlet port. The first and second bodies include male and female mating sections, the male mating section including an annular groove and the female mating section including at least one hole aligned with the annular groove. A replaceable seal in the cartridge section engages the valve poppet and is accessible when the male and female mating sections are disengaged. At least one releasable retainer extends through the at least one hole and engages the annular groove to hold the first and second bodies longitudinally together but it permits independent rotation.

In another aspect of the present invention, a cartridge valve comprises an operator section including a first body with pilot inlet and pilot outlet, and at least one piston mounted on a shaft in the first body; a cartridge section including a second body with a fluid inlet port and a fluid outlet port and a valve seat, a valve poppet including a valve head operably engaging the seat; and a retainer holding the first and second bodies together. The shaft defines a gap to the valve poppet when in a valve-closed home position, but abuts the valve poppet when in an air-pilot-operated position so that the shaft gains momentum before engaging the valve poppet when initially moving from the valve-closed home position.

In another aspect of the present invention, a cartridge valve comprises an operator section including a first body with pilot inlet and pilot outlet, and a piston on a shaft; a cartridge section including a second body with fluid inlet port and fluid outlet port and a valve seat, and a valve poppet including a valve head operably engaging the seat; and a releasable retainer engaging an annular feature on one of the first and second bodies body to hold the first and second bodies longitudinally together but that permits the first body to rotate on the second body.

In another aspect of the present invention, a method of assembling a cartridge valve comprises providing an operator section including a first body with pilot inlet and pilot outlet, and at least one piston mounted on a shaft in the first body; providing a cartridge section including a second body with a fluid inlet port and a fluid outlet port and a valve seat, a valve poppet including a valve head operably engaging the seat; and assembling the cartridge section to the operator section with the shaft defining a gap to the valve poppet when in a valve-closed home position, but so that the shaft abuts the valve poppet when initially moved from the valve-closed home position toward an air-pilot-operated position, so that the shaft and at least one piston gain momentum before engaging the valve poppet.

In another aspect of the present invention, a method of assembling a cartridge valve comprises providing an operator section including a first body with pilot inlet and pilot outlet, and a piston on a shaft; providing a cartridge section including a second body with fluid inlet port and fluid outlet port and a valve seat, and a valve poppet including a valve head operably engaging the seat; and assembling an operator section to the cartridge section by installing a retainer that engages a hole in one of the first and second bodies and that engages an annular feature on the other of the first and second bodies to hold the first and second bodies longitudinally together but in a way that permits the first body to rotate on the second body.

An object of the present invention is to provide a cartridge valve that will fit into very tight spaces, such as in a manifold. It does this in part by its small size, due in part to its double piston design which allows it to actuate against significant downstream backpressure.

An object of the present invention is to provide a cartridge valve having a replaceable valve poppet seal, which can be replaced without extraordinary training, measures, or equipment.

An object of the present invention is to provide a cartridge valve having an operator section and mating cartridge section, where the operator section can be pneumatic, hydraulic, mechanical, electrical, or a hybrid of same, yet the cartridge section maintains the advantages noted above.

These and other aspects, objects, and features of the present invention will be understood and appreciated by those skilled in the art upon studying the following specification, claims, and appended drawings.

DETAILED DESCRIPTION OF PREFERRED EMBODIMENTS

Figures 1, 1A:
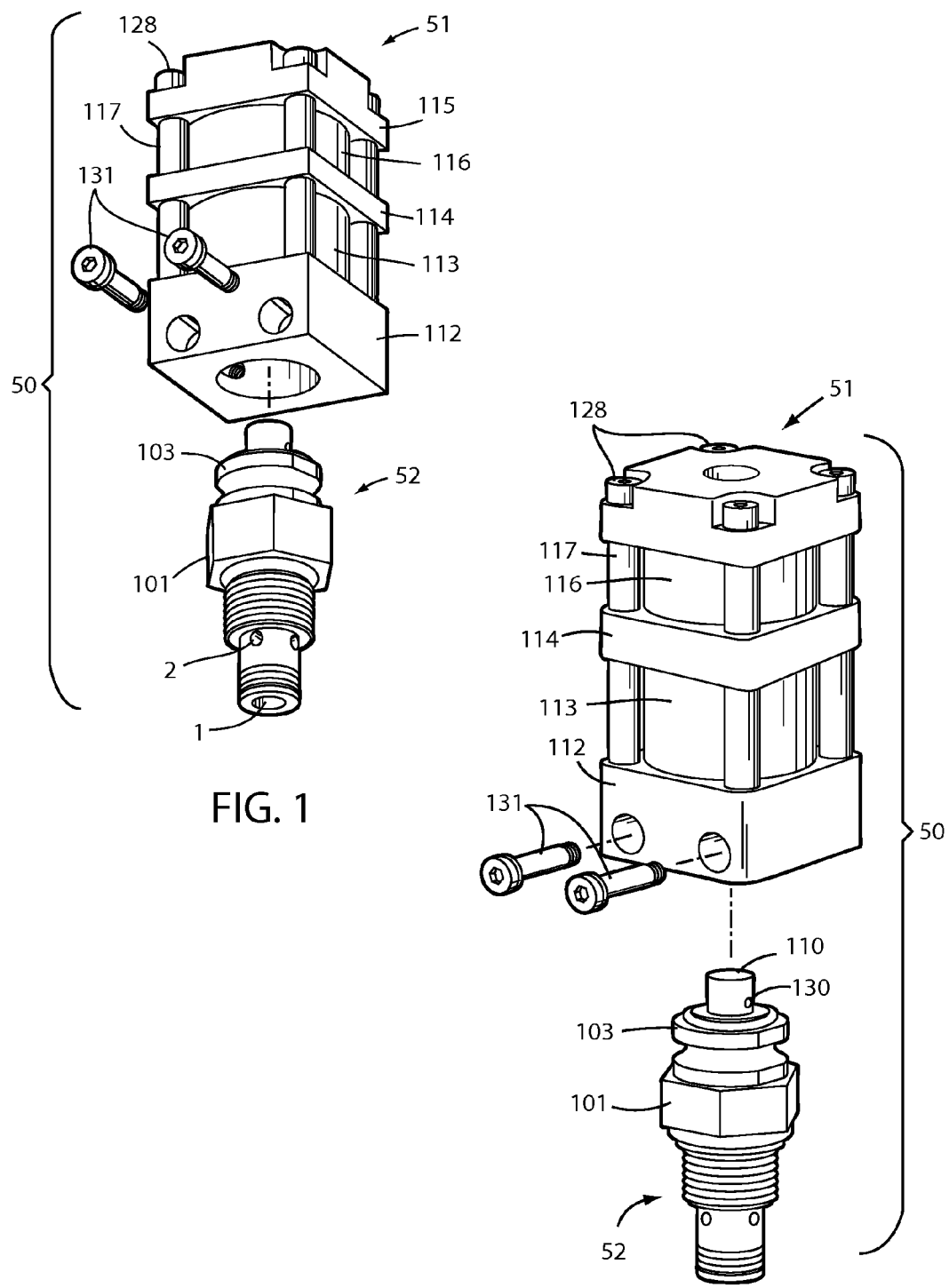
FIGS. 1-1A are partially-exploded perspective views of an air pilot operated cartridge valve (50) including an air pilot operator section (51) and a removable cartridge section (52).
Figure 2:
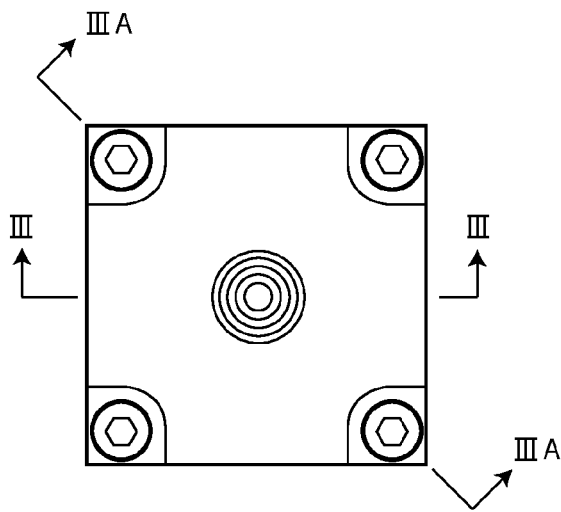
FIG. 2 is an end view of FIG. 1.

The present air pilot operated cartridge valve 50 includes an air pilot operator section 51 that is easily removable from the cartridge section 52 by the removal of shoulder screws 131. Two shoulder screws 131 hold the cartridge section 52 in the air pilot operator section 51, and permit the cartridge section 52 to rotate independently of the air pilot operator section 51. The profile of an end of the air section pilot operator section 51 (i.e. caps/blocks 112, 114, 115) may be square, which facilitates machining and assembly, but it is contemplated that they do not need to be square. The dual air piston design of valve 50 allows the operator to be 1½" square in end view, and provides more operating force than the known 1⅞" diameter operator due to operating efficiencies. The present air pilot operator section 51 is configured to provide a flow path of actuating air to the top of both pistons. Holes in the air pilot operator section 51 allow the two shoulder screws 131 to retain the cartridge section 52 in the air pilot operator section 51 while allowing the cartridge section 52 to rotate on the air pilot operator section 51, as discussed below.

Figure 3:
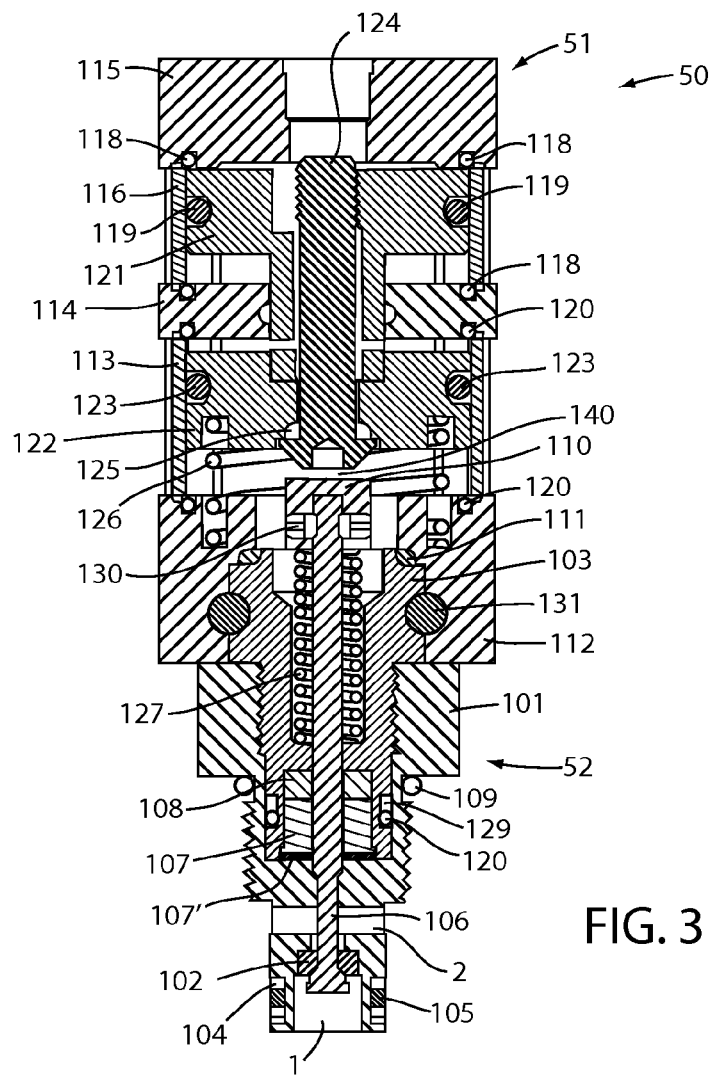
FIGS. 3-3A are cross sectional views taken along lines III-III IIIA-IIIA in FIG. 2.
Figure 3A:
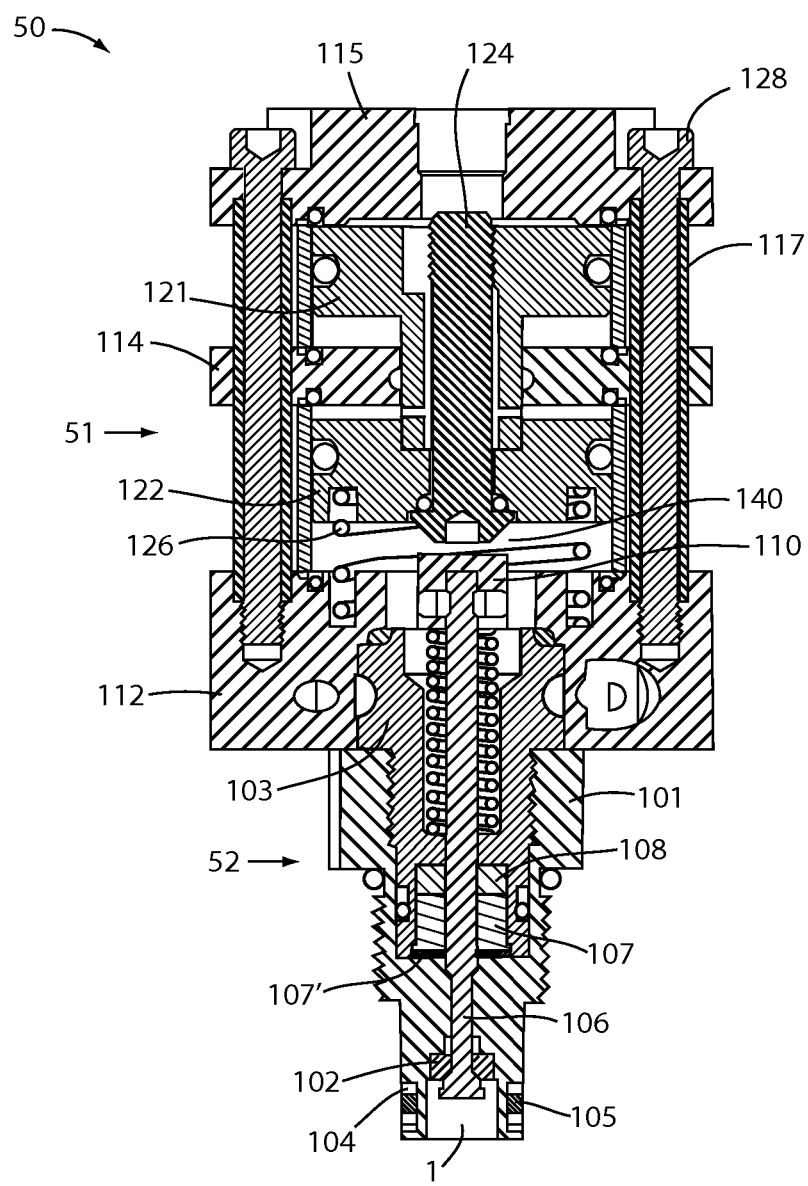

FIGS. 3-3A show the following components: 101—cartridge assembly (including a cartridge insert 103 and components forming a sealed cartridge body for the pistons to operate within), 102—valve seat, 103—cartridge insert, 104—backup washer, 105—O-ring seal, 106—valve poppet, 107—PolyPak high pressure seal, 108—PolyPak backup seal, 109—O-ring seal, 110—collar, 111—O-ring seal, 112—operator bottom cap, 113—pneumatic cylinder tube #2, 114—operator center block, 115—operator top cap, 116—pneumatic cylinder tube #1, 117—spacer tube, 118-120 O-ring seals, 121—piston #1, 122—piston #2, 123—O-ring seal, 124—piston shaft (also called "button head cap screw" herein), 125—O-ring seal, 126—piston return spring, 127—poppet return spring, 128—socket head cap screw, 129—backup washer, 130—set screw, 131—shoulder screw.

Figure 4:
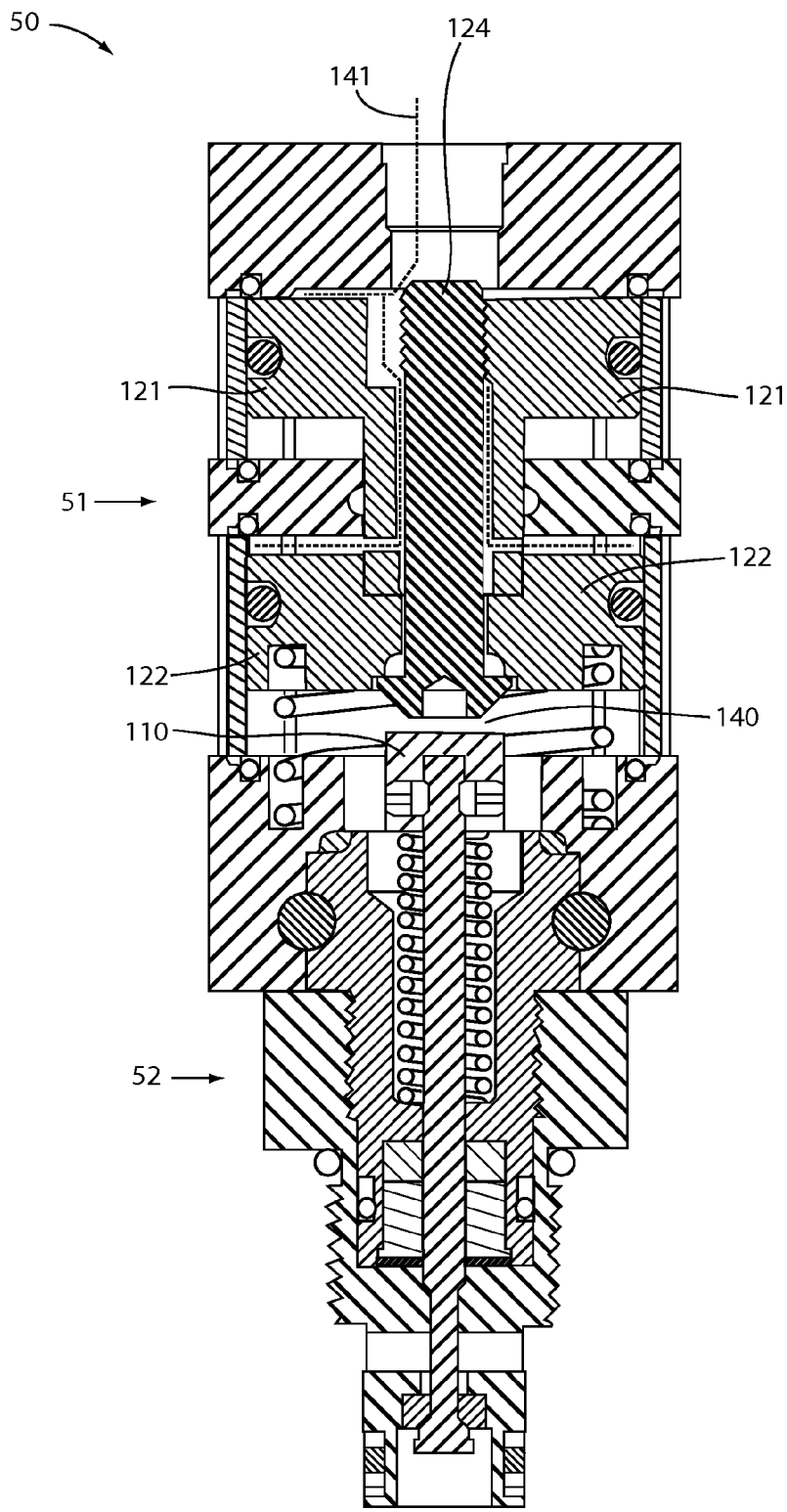
FIG. 4 is a cross sectional view similar to FIG. 3 but with dashed lines showing air pressure flow.

The space 140 (FIG. 4) between the air piston actuator (button head cap screw 124) and the collar 110 on the poppet 106 is intentional to allow the air piston seals 119 on the air piston 121 to break away so the piston 121 will be already moving when it contacts the collar 110 to move the poppet 106. The gap can be any size desired for optimal operation based on parameters of a given system. The illustrated gap is about in a range of about 0.020-0.060 inches (or more preferably about 0.030-0.050 inches, or most preferably about 0.035-0.040 inches). Pressurized air flow for causing movement of pistons 121, 122 (and movement of actuator 124) are shown by dashed lines air 141 in FIG. 4. When assembled, the two pistons 121, 122 become one on shaft 124) and move together as a unit. Compressed air for operating the pistons 121, 122 moves longitudinally through a hole(s) adjacent to the threads in the top piston 121, and in an area of the top piston 121 outside the hole necessary for the bolt 124 that holds the pistons 121, 122 together. A downwardly-extending boss of the top piston 121 fits into a bored hole in the bottom piston 122, but a radial hole(s) in the side of top piston's boss allows air to enter the area above the bottom piston 122. The force of the dual piston operator is based on the sum of the area of the top piston 121 and the bottom piston 122. The top piston 121 uses the full area of a 1.25" diameter circle to generate actuating force. The bottom piston 122 uses the same area, but less the area of the ½" diameter boss shaft 124.

Figure 6:
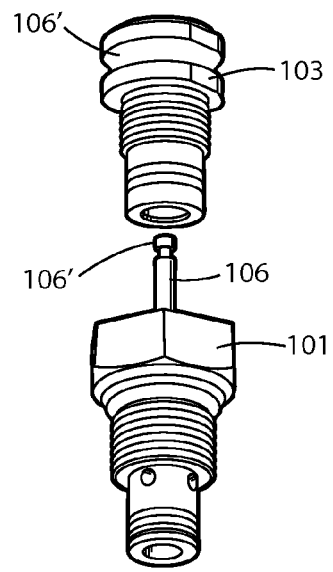

The poppet spring collar 110 (FIG. 6) is assembled to the poppet 106 via a groove 106' (FIG. 6) in the poppet 106 and set screws 130 threaded in the collar 110. The present cartridge insert 103 uses a Parker PolyPak seal 107 or similar replaceable seal (and backup PolyPak seal 108) as shown with a backup washer 107'. Removing the collar 110 from poppet 106 (by removing set screws 130) allows its removal from the cartridge insert 103. Removing the threaded cartridge insert 103 from the cartridge body 101 provides access to the replaceable seal 107 (and if used, backup seal 108). The replaceable PolyPak seal 107 is "pressure assisted" and must be inserted as shown. The larger diameter part of the seal 107 is the pressure side and it must face the poppet seat 102. The location of the seal cavity and access to the seal cavity allows the seal 107 to be reliably and accurately inserted without special tools, and to be inserted and reliably positioned for proper function.

The present innovative valve 50 with dual piston operator (see pistons 121 and 122) allows the valves to be installed on 1½" centers and have enough air actuator force to operate with 3000 psi on the (output) port 2 side of the poppet. This compares with known valves having a larger 1⅞" diameter operator, which is necessary for them to function with pressure higher than 400 psi on the (output) port 2.

Figure 5:
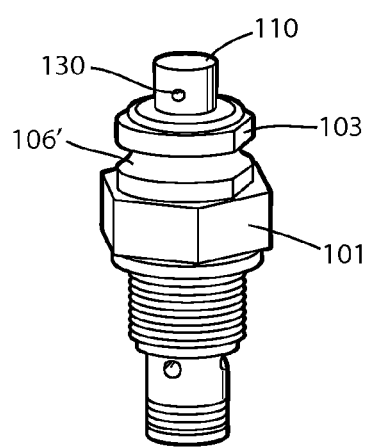
FIGS. 5-7 are views of the cartridge section (52), FIG. 5 showing the cartridge section fully sub-assembled, FIG. 6 showing the cartridge insert (103) removed from the cartridge body (101) to expose a set-screw-receiving groove (106') in the valve poppet (106), FIG. 7 showing the PolyPak Seal (107) and PolyPak Backup Seal (108) removed from the end of the cartridge insert (103).
Figure 7:
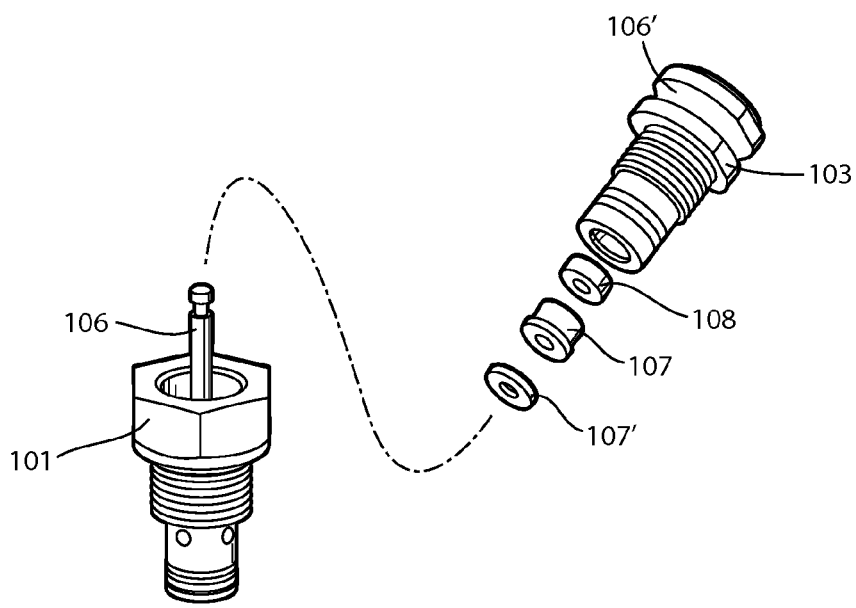

The present innovative valve poppet 106 (FIGS. 5-7) can be easily separated from its cartridge section 52 without the need for highly specialized equipment or training. Thus, if the valve air pilot operator section 51 fails, it can quickly and easily be replaced, and/or repaired.

The present innovative valve 50, complete with its operator section 51, can also be removed from its manifold easily. Specifically, the cartridge section 52 can rotate while the air pilot operator section 51 remains stationary, thus greatly simplifying removal since connected lines do not have to be removed first. Also, the hex on the cartridge body 101 has a dimension of 1" across its flats. This allows this valve 50 to be installed into (and used in) very tight spaces . . . which is a very common problem in viscous fluid distribution manifolds. Alternatively, if there is room for the operator section 51 to rotate, it can be rotated with the hex and with cartridge section 52, such as during installation or removal.

As shown by FIGS. 1, 5-7, the present innovative valve 50, after removal of the operator section 51, the cartridge section 52 of this innovative valve is easily disassembled for access to the valve poppet 106 and poppet seal 107. Thus, the poppet seal 107 can be easily replaced. Also, if the stem of the valve poppet 106 shows wear where it moves in the ID of the poppet seal 107, it can also be replaced.

A modified valve 50A (FIGS. 8-10) includes similar components to valve 50, with identical and similar components being identified using the same number but with the addition of the letter "A". This is done to reduce redundant discussion. A person skilled in the art will understand that the general operation of valve 50A is not unlike valve 50.

Figure 8:
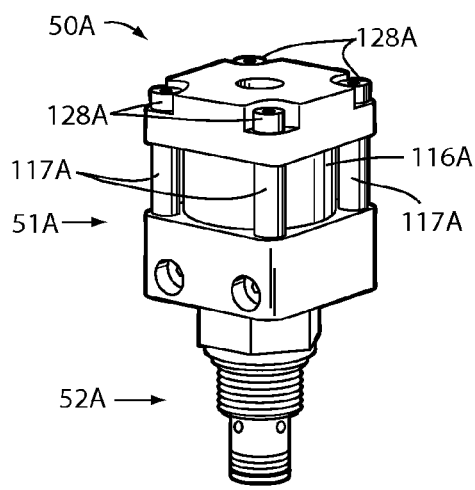
FIGS. 8-10 are perspective, exploded perspective, and longitudinal-cross-sectioned views of a modified air pilot operated cartridge valve (50) similar to FIG. 1 but only including a single-piston-operated poppet.
Figure 9:
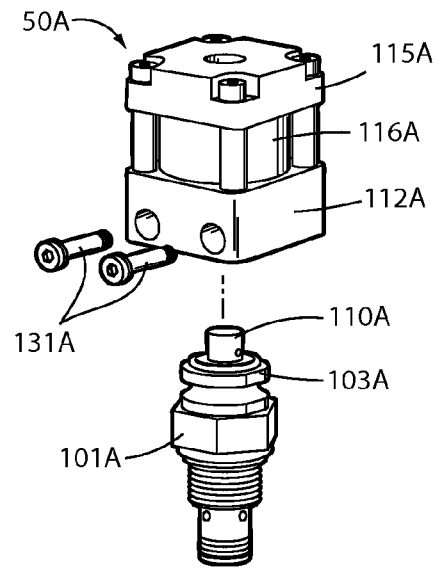
Figure 10:
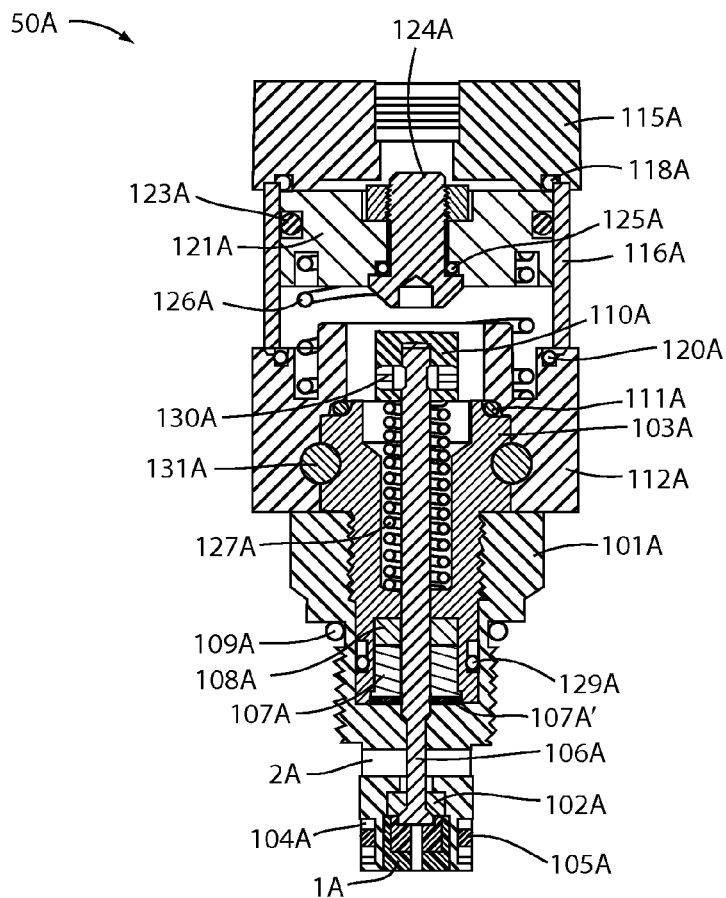

FIGS. 8-10 show the following components of valve 50A: an air pilot operator section 51A, cartridge section 52A, shoulder screws 131A, 101A—cartridge assembly (including a cartridge insert 103A and components forming a sealed cartridge body for the piston to operate within as shown), 102A—valve seat, 103A—cartridge insert, 104A—backup washer, 105A—O-ring seal, 106A—valve poppet, 107A—PolyPak seal, 107A'—backup washer, 108A—PolyPak backup seal, 109A—O-ring seal, 110A—collar, 111A—O-ring seal, 112A—operator bottom cap, 115A—operator top cap, 116A—pneumatic cylinder tube #1, 117A—spacer tube, 118A-120A—O-ring seals, 121A—piston #1, 123A—O-ring seal, 124A—button head cap screw, 125A—O-ring seal, 126A—piston return spring, 127A—poppet return spring, 128A—socket head cap screw, 129A—backup washer, 130A—set screw, 131A—shoulder screws. Valve 50A resists backflow leakage from backpressure against an outlet port, and also is repairable via replacement of its seal 107A.

Figure 11:
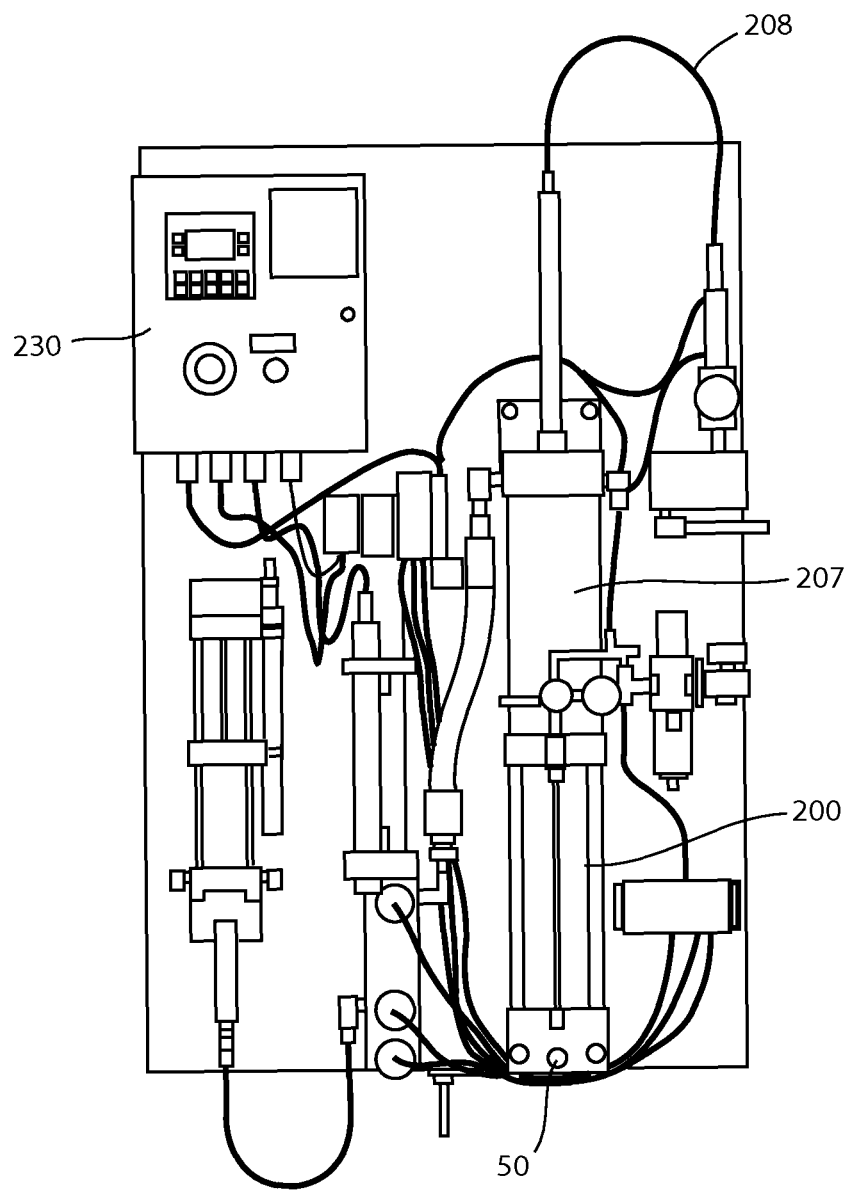
FIG. 11 is a plan view of a viscous-fluid-distributing manifold incorporating the valve of FIG. 1 and showing its tight arrangement of components.
Figure 12:
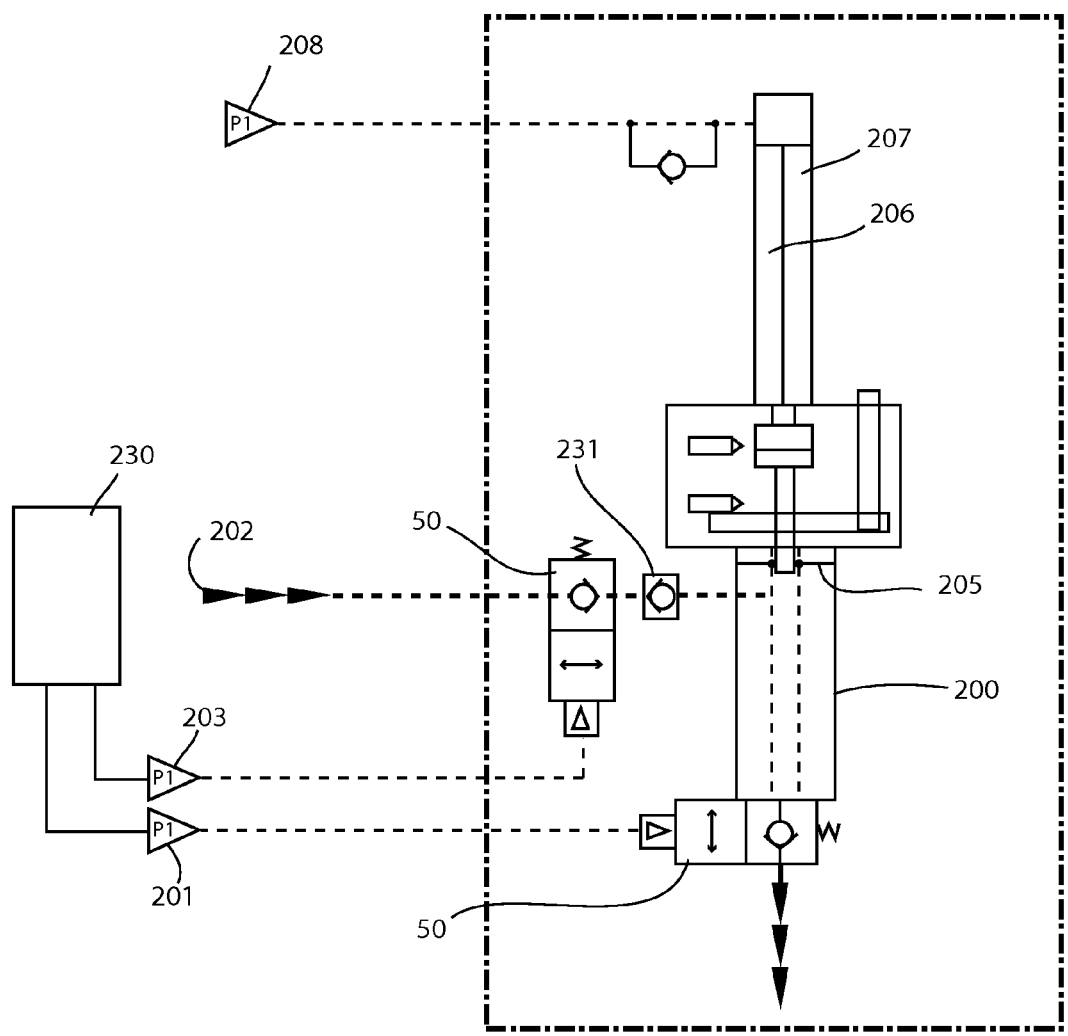
FIG. 12 is a simplified schematic showing pneumatic controls and fluid-flow lines and metering components.

FIG. 11 is a plan view of a viscous-fluid-distributing manifold incorporating the valve of FIG. 1, showing the very cramped and tight spaces between its components, and FIG. 12 is a simplified schematic of FIG. 11 showing only key pneumatic controls and fluid-flow lines and metering components. Specifically, FIG. 12 illustrates a very-accurate-repeatable cycling metering system with viscous-fluid-distribution/accumulation chamber 200 having an outlet port operably connected to valve 50 (or valve 50A), which is spring-biased to a normally closed position but which can be actuated to a dispensing position by pneumatic control 201. The chamber 200 is repeated refilled by viscous fluid supply 202 fed through a second valve 50 (or 50A) (and if desired through a check valve 231), which is controlled by pneumatic air pilot control 203. Fluid is dispensed from accumulation chamber 200 by a piston 205 operated by rod 206 and pneumatic cylinder 207, fed compressed air from source 208. A programmable controller 230 controls operation of the metering system, in part by sensors connected to the system and by controlling the various valves and pneumatics controlling the flow of control air.

It is contemplated that the present cartridge valve can have an operator section and a mating cartridge section, where the operator section can be pneumatic, hydraulic, mechanical, electrical, or a hybrid of same, yet the cartridge section maintains the advantages noted above. Further, it is contemplated that a kit can be made using a common cartridge section and having a desired operator section attached as desired by the end user. Persons skilled in the art will not require a detailed explanation of pneumatic, hydraulic, mechanical, electrical, or hybrid systems to understand such a valve, nor the advantages of a such a valve system.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A cartridge valve comprising:
    an operator section including a first body with pilot inlet and including at least one piston;
    a cartridge section including a second body with viscous fluid inlet and outlet ports, and a valve seat;
    a valve poppet including a valve head operably engaging the valve seat for controlling flow to the outlet port;
    the first and second bodies including male and female mating sections, the male mating section including an annular groove and the female mating section including at least one hole aligned with the annular groove;
    a replaceable seal in the cartridge section engaging the valve poppet and accessible and removable and replaceable when the male and female mating sections are disengaged; and
    at least one releasable retainer extending through the at least one hole and engaging the annular groove to hold the first and second bodies longitudinally together but permitting first body to rotate on the second body;
    wherein the cartridge section includes a cartridge insert removably engaging the second body, and wherein the seal is positioned between the cartridge insert and the second body;
    the cartridge insert including a protruding portion having the annular feature constructed to position the protruding portion in a mating portion of the first body, and constructed for removal and reinsertion when replacing the replaceable seal.

2. The cartridge valve of claim 1, wherein the at least one piston includes first and second pistons.

3. The cartridge valve of claim 2, wherein the first and second pistons are aligned on a common shaft and configured to operate simultaneously on a same axis.

4. The cartridge valve of claim 1, wherein the at least one piston is mounted on a shaft that is aligned with but defines a gap to the valve poppet when in a valve-closed home position, the gap closing when the at least one piston is actuated to motivate the valve poppet.

5. The cartridge valve of claim 1, wherein the operator section a pilot inlet is for operating using pneumatic or hydraulic controls.

6. A viscous fluid delivery system incorporating the cartridge valve of claim 1, the system including a system distribution line connected to the viscous output port filled with viscous fluid having a back pressure of greater than 400 psi, the back pressure in part holding the valve poppet in a closed position against the seat, and wherein a maximum transverse dimension of the first and second bodies is 1½" by 1½".

7. The system of claim 6, including a manifold assembly with the cartridge valve attached thereto, the manifold assembly in part defining the system distribution line.

8. A method of assembling a cartridge valve comprising:
providing an operator section including a first body with pilot inlet and a piston on a shaft;
providing a cartridge section including a second body with fluid inlet port and fluid outlet port and a valve seat, and a valve poppet including a valve head operably engaging the seat;
assembling an operator section to the cartridge section by installing a retainer that engages a hole in one of the first and second bodies and that engages an annular feature on the other of the first and second bodies to hold the first and second bodies longitudinally together but in a way that permits the first body to rotate on the second body;
wherein the cartridge section includes a cartridge insert with a protruding portion having the annular feature, and wherein the step of assembling includes positioning the protruding portion in a mating portion of the first body;
wherein the cartridge section includes a replaceable seal engaging the valve poppet and that is located between the cartridge insert and the second body, and including removing the cartridge insert from the second body to replace the replaceable seal and thereafter reinstalling the cartridge insert on the second body.

9. A method of claim 8, including providing a system distribution line connected to the viscous output port filled with viscous fluid having a back pressure of greater than 400 psi, the back pressure in part holding the valve poppet in a closed position against the seat, and wherein a maximum transverse dimension of the first and second bodies is 1½" by 1½".

10. The method of claim 9, including providing a manifold assembly with the cartridge valve attached thereto, the manifold assembly in part defining the system distribution line.

* * * * *